US011830122B2

(12) United States Patent
Chen (10) Patent No.: US 11,830,122 B2
(45) Date of Patent: Nov. 28, 2023

(54) 3D RECONSTRUCTION METHOD AND 3D RECONSTRUCTION SYSTEM

(71) Applicant: National Tsing Hua University, Hsinchu (TW)

(72) Inventor: Chien-Chun Chen, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/885,837

(22) Filed: Aug. 11, 2022

(65) Prior Publication Data

US 2023/0326116 A1 Oct. 12, 2023

(30) Foreign Application Priority Data

Apr. 8, 2022 (TW) .................................. 111113461

(51) Int. Cl.
*G06T 15/00* (2011.01)
*G06T 3/00* (2006.01)

(52) U.S. Cl.
CPC ............ *G06T 15/00* (2013.01); *G06T 3/0068* (2013.01)

(58) Field of Classification Search
CPC ..... G06T 15/00; G06T 15/005; G06T 11/003; G06T 17/00; G06T 17/10; G06T 19/00; G06T 19/20; G06T 2200/04; G06T 2200/08; G06T 2207/10056; G06T 2207/10061; G06T 3/0037; G06T 3/0068
See application file for complete search history.

(56) References Cited

U.S. PATENT DOCUMENTS

| 6,822,233 B2 | 11/2004 | Nakamura et al. |
| 11,525,990 B2 * | 12/2022 | Lu ....................... G01N 21/6428 |
| 11,574,794 B2 * | 2/2023 | Shánël ................ G01N 23/046 |

FOREIGN PATENT DOCUMENTS

| CN | 112129795 A | 12/2020 |
| TW | 201702991 A | 1/2017 |

* cited by examiner

*Primary Examiner* — Hau H Nguyen
(74) *Attorney, Agent, or Firm* — Birch, Stewart, Kolasch & Birch, LLP (57) ABSTRACT

A 3D reconstruction method for a thin film sample that includes a light element is provided. The method includes performing preprocessing that includes noise removal, field-of-view correction and background subtraction on original projection images captured by a scanning transmission electron microscope to obtain 2D images, performing several rounds of a 3D reconstruction procedure that includes an alignment process and an iterative algorithm based on the 2D images and reference images to obtain a piece of reconstructed 3D image data, generating a reconstructed 3D image related to the thin film sample based on the piece of reconstructed 3D image data, and displaying the reconstructed 3D image.

6 Claims, 7 Drawing Sheets

3D RECONSTRUCTION METHOD AND 3D RECONSTRUCTION SYSTEM

CROSS-REFERENCE TO RELATED APPLICATION

This application claims priority to Taiwanese Invention Patent Application No. 111113461, filed on Apr. 8, 2022.

FIELD

The disclosure relates to a three-dimensional (3D) reconstruction technique, and more particularly to a 3D reconstruction method and a 3D reconstruction device for a thin film sample including a light element.

BACKGROUND

When using a transmission electron microscope to capture an image of a thin film sample (e.g., a copolymer) that consists of light elements, such as hydrogen, carbon, nitrogen, oxygen, etc., the result may be unsatisfactory because contrast in the resulting images would not be high enough. Therefore, the thin film sample is usually stained before image capturing to enhance contrast. However, stains may interact with the thin film sample and cause a structural change in the thin film sample, so misjudgment might be made based on the resulting image captured using this approach.

SUMMARY

Therefore, an object of the disclosure is to provide a three-dimensional (3D) reconstruction method and a 3D reconstruction device that are adapted for a thin film including a light element and that can alleviate at least one drawback of the prior art.

According to one aspect of the disclosure, the 3D reconstruction method is to be implemented by a scanning transmission electron microscope (STEM) and a processor, and includes the following steps.

In one step, by the STEM, N number of original projection images of a target area of the thin film sample are captured when the target area is at N number of different angles with respect to a horizontal plane, respectively, where N is a positive integer and the N number of different angles include a zero-degree angle, a plurality of positive angles and a plurality of negative angles.

In one step, by the processor, preprocessing is performed on the N number of original projection images to obtain N number of two-dimensional (2D) images that respectively correspond to the N number of different angles, where the preprocessing includes noise removal, field-of-view correction and background subtraction.

In one step, by the processor, a 3D reconstruction procedure is performed based on the N number of 2D images and N number of reference images that respectively correspond to the N number of different angles to obtain a piece of reconstructed 3D image data related to the target area. The 3D reconstruction procedure includes:

for each of the N number of 2D images, performing an alignment process on the 2D image so as to obtain an aligned 2D image that corresponds to the respective one of the N number of different angles, where the alignment process includes image shifting and image rotation, the 2D image is shifted by a pixel shifting amount that falls within a specific pixel range and rotated by an angle rotating amount that falls within a specific angular range to result in the aligned 2D image such that the aligned 2D image has minimum error in terms of pixel values with respect to the corresponding one of the N number of reference images, and the pixel shifting amount and the angle rotating amount for each of the N number of 2D images are recorded, generating an initial 3D data distribution in reciprocal space based on the aligned 2D images that respectively correspond to the N number of different angles by using discrete Fourier transform and interpolation, combining the initial 3D data distribution and an arbitrary data distribution to obtain a piece of 3D distribution data related to the target area in the reciprocal space, where the arbitrary data distribution is related to reciprocal lattice points in the reciprocal space without the initial 3D data distribution, performing an iterative algorithm based on the piece of 3D distribution data to obtain a piece of iterative 3D distribution data in the reciprocal space, the iterative algorithm including performing inverse Fourier transform on the piece of 3D distribution data to obtain a piece of 3D image data in real space, extracting a 3D image data part that corresponds to the target area from the piece of 3D image data, and performing Fourier transform on the 3D image data part to obtain the piece of iterative 3D distribution data, substituting a piece of 3D data in the reciprocal space for a data part of the piece of iterative 3D distribution data that corresponds to the target area to obtain a piece of updated 3D distribution data which serves as the piece of 3D distribution data for a next round of the iterative algorithm, the piece of 3D data being obtained by performing Fourier transform on the N number of 2D images, repeating performing the iterative algorithm and substituting the piece of 3D data until it is determined that an error between the 3D image data part that was extracted in a latest round of the iterative algorithm and the 3D image data part that was extracted in a second latest round of the iterative algorithm is smaller than a threshold value, and making the 3D image data part that was extracted in the latest round of the iterative algorithm serve as a piece of reconstructed 3D image data that is obtained in this round of the 3D reconstruction procedure.

In one step, by the processor, from the piece of reconstructed 3D image data, N pieces of 2D image data that respectively correspond to the N number of different angles are extracted to serve as the N number of reference images for a next round of the 3D reconstruction procedure.

In one step, by the processor, performing the 3D reconstruction procedure and extracting the N pieces of 2D image data are repeated until it is determined that the pixel shifting amounts and the angle rotating amounts recorded for the N number of 2D images in a latest round of the 3D reconstruction procedure match the pixel shifting amounts and the angle rotating amounts recorded for the N number of 2D images in a second latest round of the 3D reconstruction procedure.

In one step, by the processor, a reconstructed 3D image of the target area is generated based on the piece of reconstructed 3D image data that was obtained in the latest round of the 3D reconstruction procedure.

In one step, by the processor, a display device is controlled to display the reconstructed 3D image thus generated.

According to another aspect of the disclosure, the 3D reconstruction system includes a STEM, a storage device, a display device and a processor. The STEM includes a platform that is rotatable about an axis. The thin film sample is disposed on the platform and has a target area that corresponds in position to the axis. The STEM is configured to capture N number of original projection images of the target area when the target area is at N number of different angles with respect to a horizontal plane, respectively, where N is a positive integer and the N number of different angles include a zero-degree angle, a plurality of positive angles and a plurality of negative angles. The storage device is configured for data storage. The display device is configured for image display. The processor is electrically connected to the STEM, the storage device and the display device.

The processor is configured to receive the N number of original projection images from the STEM, and store the N number of original projection images in the storage device.

The processor includes a preprocessing module, an alignment module, a processing module, an iterative algorithm module, an iterative determination module, a reconstruction determination module and a reconstruction module.

The preprocessing module performs preprocessing on the N number of original projection images to obtain N number of two-dimensional (2D) images that respectively correspond to the N number of different angles. The preprocessing includes noise removal, field-of-view correction and background subtraction.

The processor performs a 3D reconstruction procedure based on the N number of 2D images and N number of reference images that respectively correspond to the N number of different angles to obtain a piece of reconstructed 3D image data related to the target area.

During the 3D reconstruction procedure,
the alignment module, for each of the N number of 2D images, performs an alignment process on the 2D image so as to obtain an aligned 2D image that corresponds to the respective one of the N number of different angles, where the alignment process that includes image shifting and image rotation, the 2D image is shifted by a pixel shifting amount that falls within a specific pixel range and rotated by an angle rotating amount that falls within a specific angular range to result in the aligned 2D image such that the aligned 2D image has minimum error in terms of pixel values with respect to the corresponding one of the N number of reference images,
the alignment module, for each of the N number of 2D images, records the pixel shifting amount and the angle rotating amount in the storage device,
the processing module generates an initial 3D data distribution in reciprocal space based on the aligned 2D images that respectively correspond to the N number of different angles by using discrete Fourier transform and interpolation,
the processing module combines the initial 3D data distribution and an arbitrary data distribution to obtain a piece of 3D distribution data related to the target area in the reciprocal space, where the arbitrary data distribution is related to reciprocal lattice points in the reciprocal space without the initial 3D data distribution,
the iterative algorithm module performs an iterative algorithm based on the piece of 3D distribution data to obtain a piece of iterative 3D distribution data in the reciprocal space, where the iterative algorithm includes performing inverse Fourier transform on the piece of 3D distribution data to obtain a piece of 3D image data in real space, extracting a 3D image data part corresponding to the target area from the piece of 3D image data, and performing Fourier transform on the 3D image data part to obtain the piece of iterative 3D distribution data,
the iterative algorithm module substitutes a piece of 3D data in the reciprocal space for a data part of the piece of iterative 3D distribution data that corresponds to the target area to obtain a piece of updated 3D distribution data that serves as the piece of 3D distribution data for a next round of the iterative algorithm, where the piece of 3D data is obtained by performing Fourier transform on the N number of 2D images and being stored in the storage device,
the iterative algorithm module repeatedly performing the iterative algorithm and substituting the piece of 3D data until it is determined by the iterative determination module that an error between the 3D image data part that was extracted in a latest round of the iterative algorithm and the 3D image data part that was extracted in a second latest round of the iterative algorithm is smaller than a threshold value,
the iterative determination module makes the 3D image data part that was extracted in the latest round of the iterative algorithm serve as a piece of reconstructed 3D image data that is obtained in this round of the 3D reconstruction procedure.

The processor is configured to extract, from the piece of reconstructed 3D image data, N pieces of 2D image data that respectively correspond to the N number of different angles to serve as the N number of reference images for a next round of the 3D reconstruction procedure.

The processor is configured to repeatedly perform the 3D reconstruction procedure and extract the N pieces of 2D image data until it is determined by the iterative determination module that the pixel shifting amounts and the angle rotating amounts recorded for the N number of 2D images in a latest round of the 3D reconstruction procedure match the pixel shifting amounts and the angle rotating amounts recorded for the N number of 2D images in a second latest round of the 3D reconstruction procedure.

The reconstruction module is configured to generate a reconstructed 3D image of the target area based on the piece of reconstructed 3D image data that was obtained in the latest round of the 3D reconstruction procedure.

The processor is configured to control a display device to display the reconstructed 3D image thus generated.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
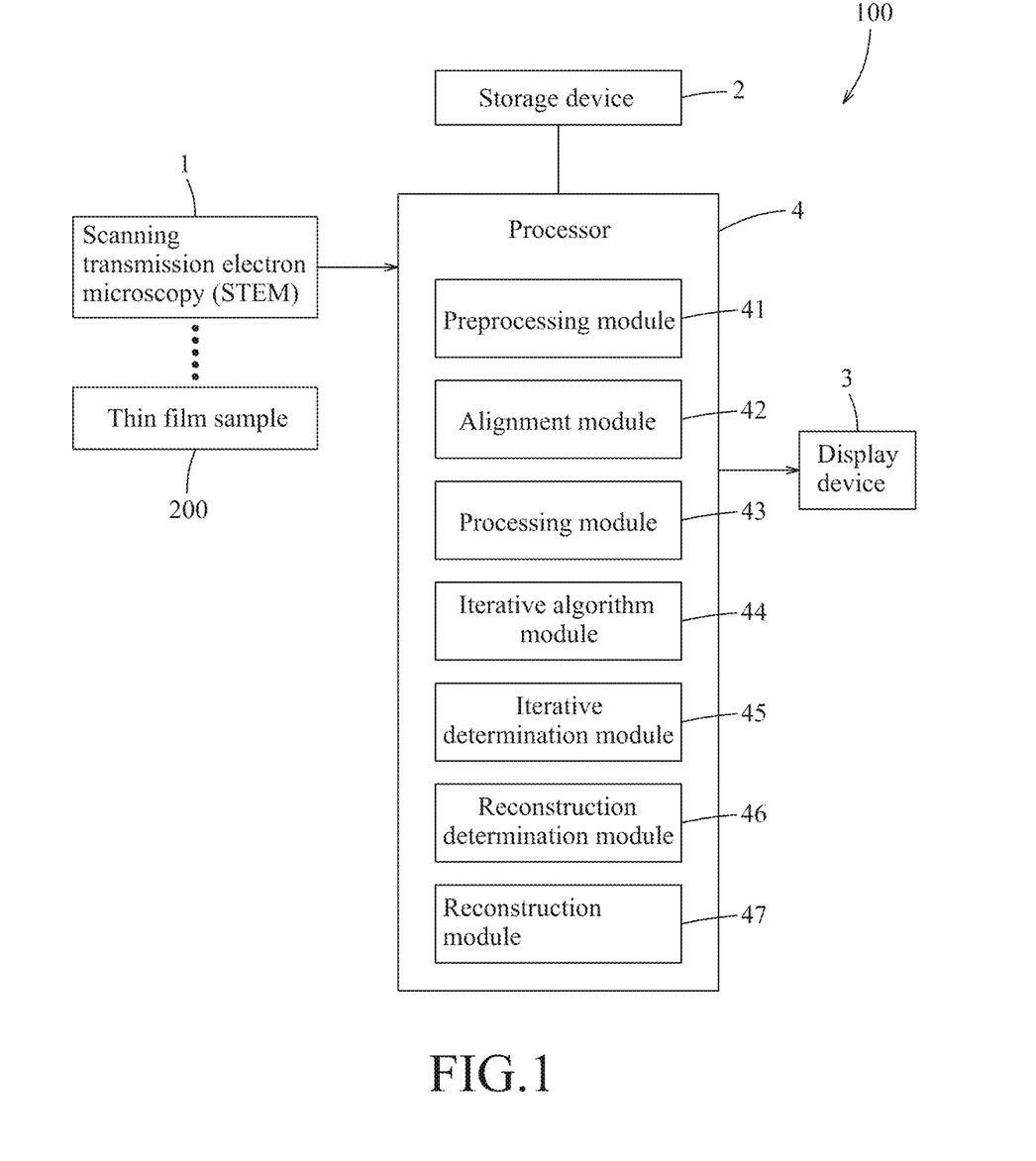
FIG. 1 is a block diagram illustrating a three-dimensional (3D) reconstruction system for a thin film sample including a light element according to an embodiment of the disclosure.

Referring to FIG. 1, a three-dimensional (3D) reconstruction system 100 according to an embodiment of this disclosure is used to generate a reconstructed 3D image of a thin film sample 200 (for example, a copolymer) that includes a light element (such as hydrogen, carbon, nitrogen, oxygen, or combinations thereof). The 3D reconstruction system 100 includes a scanning transmission electron microscopy (STEM) 1, a storage device 2, a display device 3 and a processor 4 that is electrically connected to the STEM 1, the storage device 2 and the display device 3. In some embodiments, the storage device 2 is a non-volatile memory, the display device 3 is a screen, and the processor 4 is a central processing unit. In some embodiments, the storage device 2, the display device 3 and the processor 4 may be implemented by a computer, such as but not limited to, a desktop computer, a notebook computer or a tablet computer.

Figure 2:
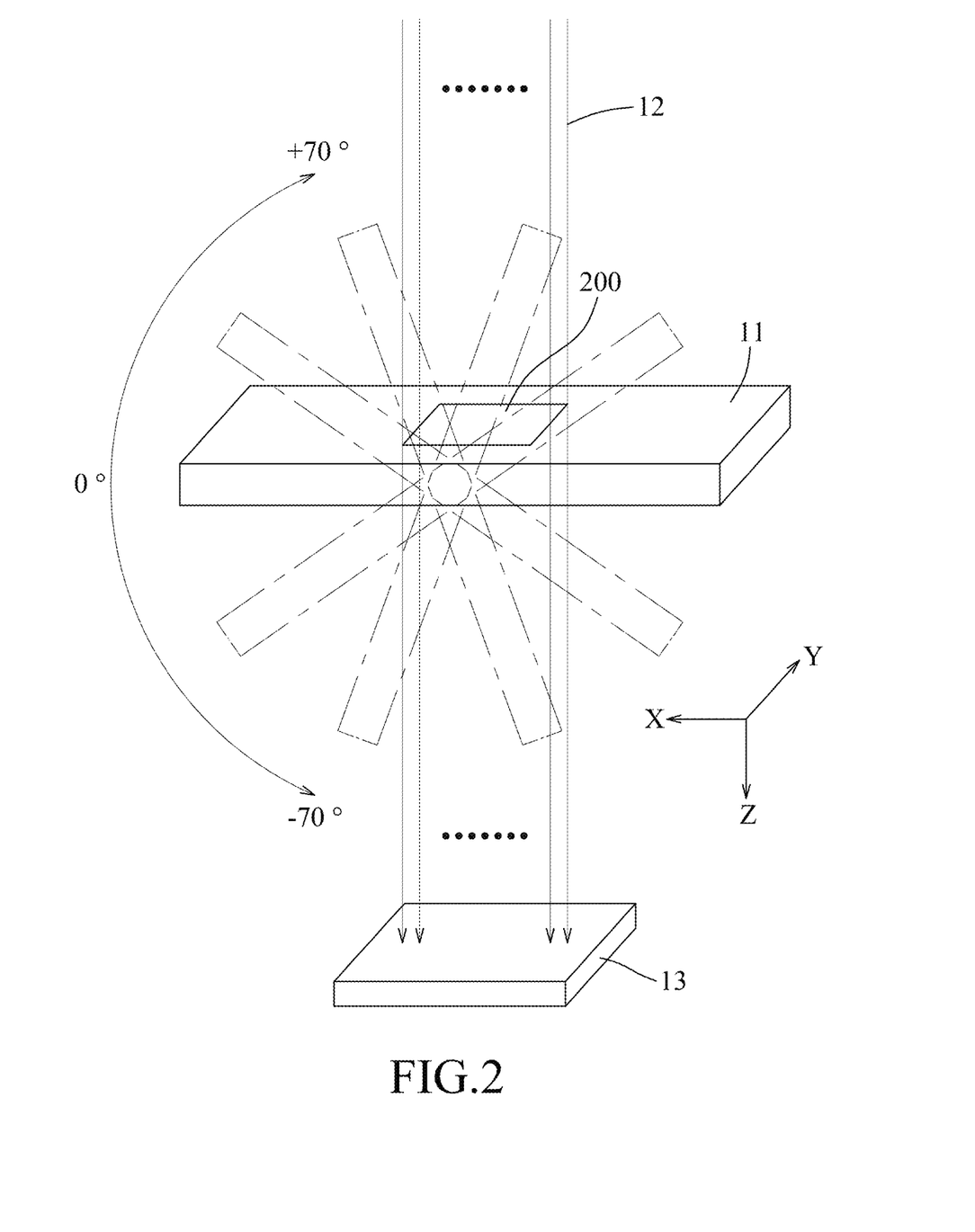
FIG. 2 is a schematic diagram illustrating a scanning transmission electron microscopy according to an embodiment of the disclosure.

Referring to FIG. 2, the STEM 1 includes a platform 11 that is rotatable about an axis extending in a Y direction. The thin film sample 200 is disposed on the platform 11 and has a target area corresponding in position to the axis, that is, a center of the target area is registered to the axis. In this disclosure, when the platform 11 is parallel to a horizontal plane, an angle between the target area of the thin film sample 200 and the horizontal plane is zero degrees; when the platform 11 is rotated in the clockwise direction from the perspective of FIG. 2, an angle between the target area and the horizontal plane is defined as a positive angle; when the platform 11 is rotated in the counterclockwise direction from the perspective of FIG. 2, an angle between the target area and the horizontal plane is defined as a negative angle. For example, the target area may be position at an angle with respect to the horizontal plane ranging from about 70 degrees to about −70 degrees. An X direction is on the horizontal plane and perpendicular to the Y axis. The STEM 1 emits an electron beam 12 in a Z direction which is perpendicular to the X direction and the Y direction. The electron beam 12 passes through the target area of the thin film sample 200 and the platform 11, and is detected by a STEM detector 13 disposed underneath the platform 11 to obtain at least one original projection image.

The processor 4 includes a preprocessing module 41, an alignment module 42, a processing module 43, an iterative algorithm module 44, an iterative determination module 45, a reconstruction determination module 46 and a reconstruction module 47. In some embodiments, the aforementioned modules include software modular blocks that include instruction codes to be executed to carry out corresponding functions described in this disclosure. In some embodiments, the aforementioned modules include hardware modules or circuits configured to carry out the corresponding functions.

Figure 3:
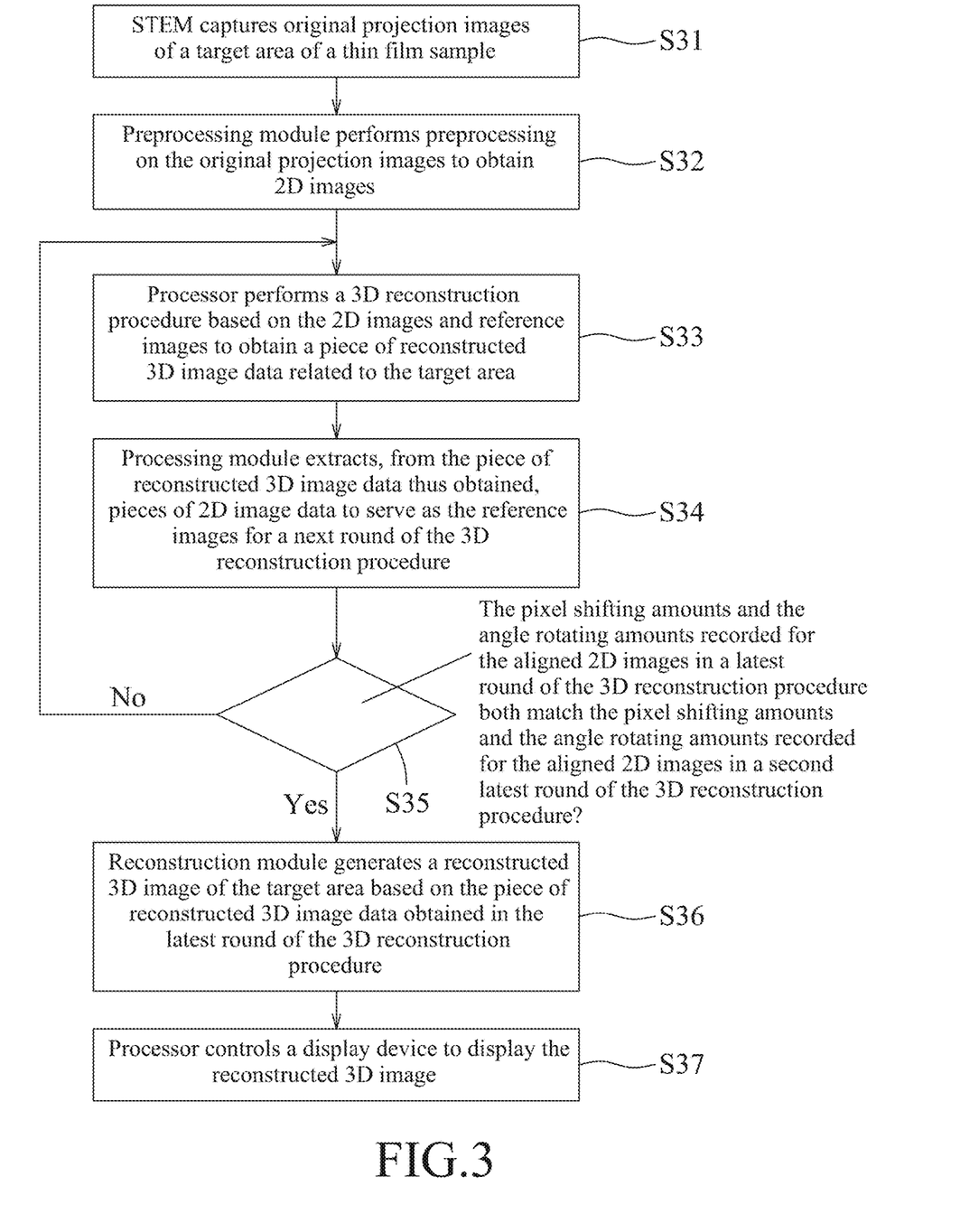
FIG. 3 is a flow chart illustrating a 3D reconstruction method according to an embodiment of the disclosure.

Referring to FIG. 3, a 3D reconstruction method for a thin film sample including a light element according to an embodiment of this disclosure is illustrated. The 3D reconstruction method is to be implemented by the 3D reconstruction system 100 exemplarily shown in FIG. 1, and includes steps S31 to S37.

Figure 6:
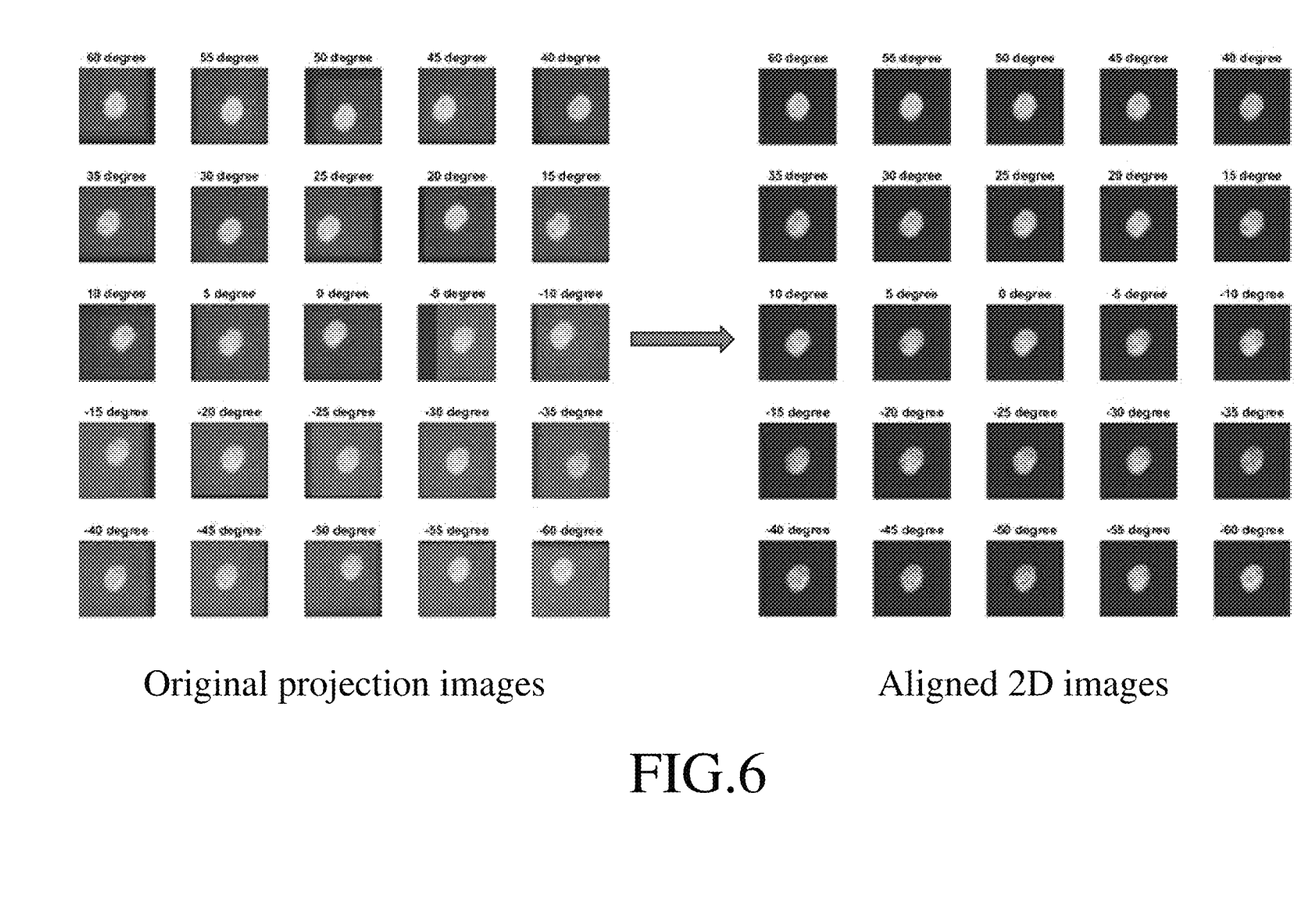
FIG. 6 illustrates examples of original projection images and aligned two-dimensional (2D) images according to an embodiment of this disclosure.

In step S31, for image reconstruction of the target area of the thin film sample 200, the STEM 1 captures N number of original projection images of the target area when the target area is at N number of different angles with respect to the horizontal plane, respectively, where N is a positive integer and the N number of different angles include an angle of zero degrees, a plurality of positive angles and a plurality of negative angles. For example, when N equals 25, twenty-five original projection images of the target area at 60-degree angle, 55-degree angle, . . . , 5-degree angle, 0-degree angle, −5-degree angle, . . . , −55-degree angle and −60-degree angle are respectively captured by the STEM 1, and the STEM 1 transmits the twenty-five original projection images to the processor 4. Referring to FIG. 6, a left part of the figure exemplarily illustrates the twenty-five original projection images at the aforementioned twenty-five angles, respectively.

The processor 4 receives the N number of original projection images, and stores the same in the storage device 2.

In step S32, the preprocessing module 41 of the processor 4 performs preprocessing that includes noise removal, field-of-view correction and background subtraction on the N number of original projection images to obtain N number of two-dimensional (2D) images that respectively correspond to the N number of different angles. Specifically, for each of the N number of original projection images, the preprocessing module 41 uses an algorithm of ensemble empirical mode decomposition to filter out noise so as to promote signal-to-noise ratio of the original projection image. Subsequently, the preprocessing module 41 performs field-of-view correction with respect to the X direction on each of the original projection images that has subjected to the noise removal. In some embodiments, field-of-view correction is not required for the original projection image that corresponds to the angle of zero degrees, and the field-of-view correction is performed based on a function $X_\theta = X_0 \cos\theta$, where $X_\theta$ represents a corrected field of view in the X direction for the original projection image that corresponds to an angle of $\theta$ degrees and $X_0$ represents a width in the X direction of the original projection image that corresponds to 0 degrees. Accordingly, for each of those of the original projection images subjected to the field-of-view correction, only image data (e.g., pixel values) within the field of view in the X direction are maintained, and image data outside the field of view are deleted. Lastly, the preprocessing module 41 performs background subtraction with respect to each of the original projection images that has undergone the noise removal and the field-of-view correction, so as to obtain the N number of 2D images. In some embodiments, the 2D image that corresponds to the angle of zero degrees (referred to as "0-degree 2D image" hereinafter) is obtained based on an equation:

$$P_{bg}^0 \text{correct}(x,y) = P_{raw}^0(x,y) - \alpha_0 \times \text{mean}(P_{raw}^0(x,y)),$$

where $P_{bg}^0$ correct represents the 0-degree 2D image, $P_{raw}^0$ represents the original projection image that corresponds to the angle of zero degrees after the noise removal, $\alpha_0$ is decided in such a manner that image data corresponding to a background area of $P_{raw}^0$ (i.e., an area not including a structure of the thin film sample 200) have magnitudes greater than but substantially equal to zero, and x, y respectively represent coordinates of an image. Similarly, the 2D image that corresponds to the angle of θ degrees (referred to as "θ-degree 2D image" hereinafter) is obtained based on an equation:

$$P_{bg}^{\theta}\text{correct}(x,y)=P_{raw}^{\theta}(x,y)-\alpha_{\theta}\times\text{mean}(P_{raw}^{\theta}(x,y)),$$

where $P_{bg}^{\theta}$ correct represents the θ-degree 2D image, $P_{raw}^{\theta}$ represents the original projection image that corresponds to the angle of θ degrees after the noise removal, $\alpha_{\theta}$ is decided in such a manner that $f^{\theta}(y)$ and $f^{0}(y)$ have a minimum difference, $f^{\theta}(y)$ represents a one-dimensional function that is obtained by summing up all image data of $P_{bg}^{\theta}$correct(x,y) in the X direction, and $f^{0}(y)$ represents a one-dimensional function that is obtained by summing up all image data of $P_{bg}^{0}$correct(x,y) in the X direction.

In some embodiments, the preprocessing module 41 adjusts a center of mass of the 0-degree 2D image to a center point of the 0-degree 2D image, and the center of mass located at the center point serves as an origin of a coordinate system for the 0-degree 2D image.

Figure 4:
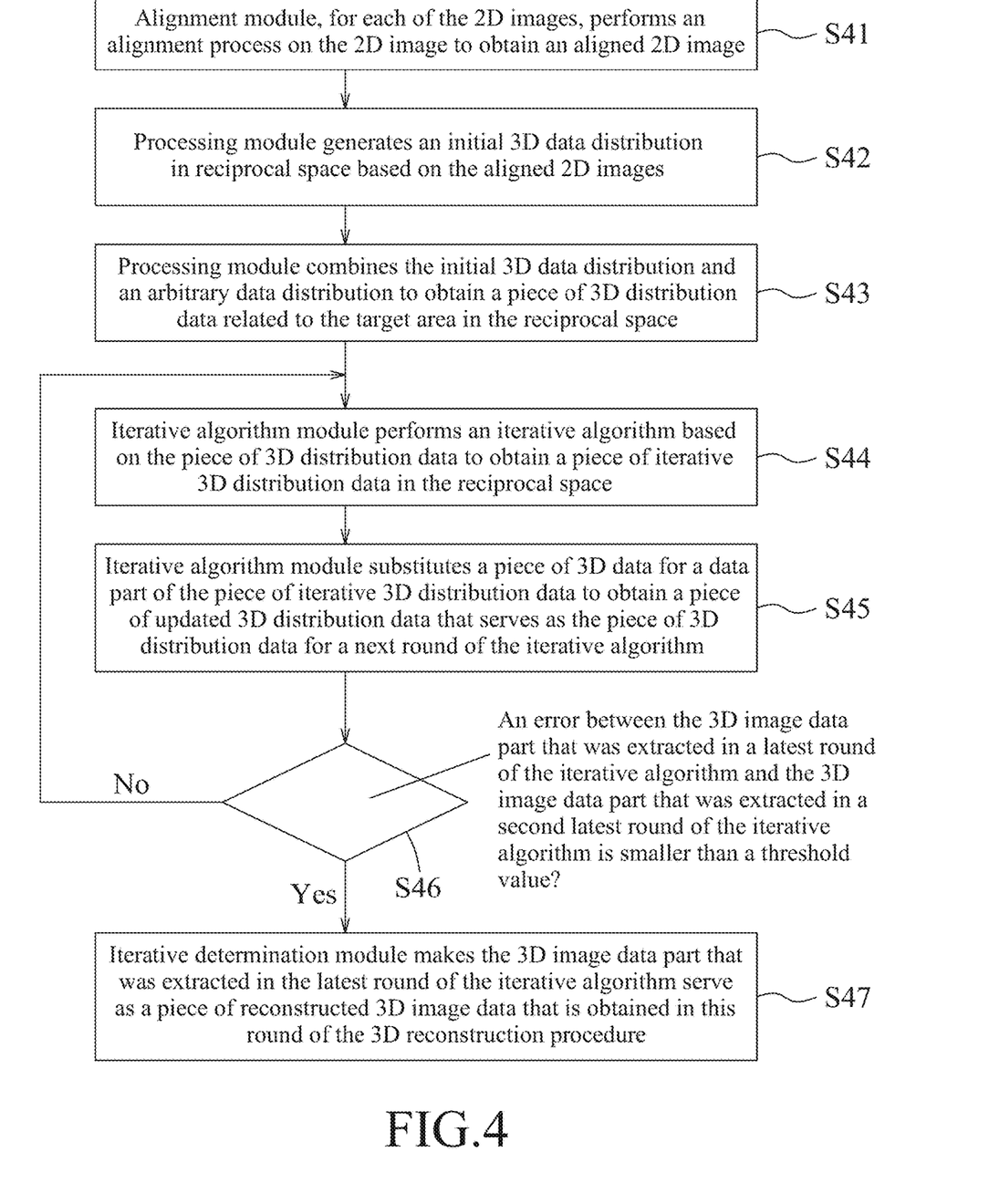
FIG. 4 is a flow chart illustrating sub-steps of a 3D reconstruction procedure according to an embodiment of this disclosure.

In step S33, the processor 4 performs a 3D reconstruction procedure based on the N number of 2D images and N number of reference images that respectively correspond to the N number of different angles (the reference image that corresponds to the angle of θ degrees being referred to as "θ-degree reference image" hereinafter) to obtain a piece of reconstructed 3D image data related to the target area. Referring to FIG. 4, the 3D reconstruction procedure includes sub-steps S41 to S47.

In sub-step S41, the alignment module 42, with respect to each of the N number of 2D images, performs an alignment process on the 2D image so as to obtain an aligned 2D image that corresponds to the respective one of the N number of different angles (the aligned 2D image that corresponds to the angle of θ degrees being referred to as "θ-degree aligned 2D image" hereinafter). The alignment process includes image shifting and image rotation. The 2D image is shifted in one direction by a pixel shifting amount that falls within a specific pixel range (for example, the 2D image that has 512×512 pixels may be shifted up, down, left or right by 50 pixels at the most (i.e., the specific pixel range is from 0 to 50 pixels)) and rotated by an angle rotating amount that falls within a specific angular range (for example, the 2D image may be rotated in the clockwise or counterclockwise direction by 3 degrees at the most (i.e., the specific angular range is from 0 to 3 degrees)) to result in the aligned 2D image such that the aligned 2D image has minimum error in terms of pixel values with respect to the corresponding one of the N number of reference images. The processor 4 then records the pixel shifting amount and the angle rotating amount for each of the N number of 2D images in the storage device 2.

In some embodiments, for the alignment process in a first round of the 3D reconstruction procedure, the alignment module 42 performs the alignment process according to the following rules:
1. The 0-degree 2D image serves as the 0-degree reference image, and is identical to the 0-degree aligned 2D image.
2. The alignment process is performed on the N number of 2D images other than the 0-degree 2D image in an order from the 2D image that corresponds to an angle with the smallest magnitude to the 2D image that corresponds to an angle with the largest magnitude.
3. For each of the N number of different angles other than the zero-degree angle, the reference image that corresponds to this angle is the aligned 2D image that corresponds to an adjacent angle which is next to this angle and has a smaller magnitude than this angle.

Following the aforementioned example where N equals 25 and the twenty-five angles are the 60-degree angle, the 55-degree angle, ..., the 5-degree angle, the 0-degree angle, the −5-degree angle, ..., the −55-degree angle and the −60-degree angle, the alignment module 42 makes the 0-degree 2D image serve as the 5-degree reference image and the −5-degree reference image. Then, the alignment module 42 shifts the 5-degree 2D image and the −5-degree 2D image by moving one pixel at a time, and compares these images after each movement with the 5-degree reference image and the −5-degree reference image, respectively, so as to obtain the pixel shifting amounts respectively for the 5-degree 2D image and the −5-degree 2D image that result in minimum differences with respect to the 5-degree reference image and the −5-degree reference image, respectively. Next, the alignment module 42 rotates the 5-degree 2D image and the −5-degree 2D image by rotating one degree at a time, and compares these images after each rotation with the 5-degree reference image and the −5-degree reference image, respectively, so as to obtain the angle rotation amounts respectively for the 5-degree 2D image and the −5-degree 2D image that result in minimum differences with respect to the 5-degree reference image and the −5-degree reference image, respectively. Lastly, for each of the 5-degree 2D image and the −5-degree 2D image, the alignment module 42 shifts and rotates the 2D image by the corresponding pixel shifting amount and the corresponding angle rotation amount, respectively, in order to obtain the corresponding one of the 5-degree aligned 2D image and the −5-degree aligned 2D image. The alignment module 42 further stores, for each of the 5-degree 2D image and the −5-degree 2D image, the corresponding pixel shifting amount and the corresponding angle rotation amount in the storage device 2.

Similarly, the alignment module 42 makes the 5-degree aligned 2D image and the −5-degree aligned 2D image serve as the 10-degree reference image and the −10-degree reference image, respectively. Then, the alignment module 42 shifts the 10-degree 2D image and the −10-degree 2D image by moving one pixel at a time, and compares these images after each movement with the 10-degree reference image and the −10-degree reference image, respectively, so as to obtain the pixel shifting amounts respectively for the 10-degree 2D image and the −10-degree 2D image that result in minimum differences with respect to the 10-degree reference image and the −10-degree reference image, respectively. Next, the alignment module 42 rotates the 10-degree 2D image and the −10-degree 2D image by rotating one degree at a time, and compares these images after each rotation with the 10-degree reference image and the −10-degree reference image, respectively, so as to obtain the angle rotation amounts respectively for the 10-degree 2D image and the −10-degree 2D image that result in minimum differences with respect to the 10-degree reference image and the −10-degree reference image, respectively. Lastly, for each of the 10-degree 2D image and the −10-degree 2D image, the alignment module 42 shifts and rotates the 2D image by the corresponding pixel shifting amount and the corresponding angle rotation amount, respectively, to obtain the corresponding one of the 10-degree aligned 2D image and the −10-degree aligned 2D image. The alignment module 42 further stores, for each of the 10-degree 2D image and the −10-degree 2D image, the corresponding pixel shifting amount and the corresponding angle rotation amount in the storage device 2.

The alignment module 42 performs the alignment process on the remainder of the 2D images in a similar fashion to obtain the remainder of the aligned 2D images.

In sub-step S42, the processing module 43 generates an initial 3D data distribution in reciprocal space (i.e., Fourier space) based on the aligned 2D images that respectively correspond to the N number of different angles by using discrete Fourier transform and interpolation.

In sub-step S43, the processing module 43 combines the initial 3D data distribution and an arbitrary data distribution to obtain a piece of 3D distribution data that is related to the target area in the reciprocal space, wherein the arbitrary data distribution is related to reciprocal lattice points in the reciprocal space without the initial 3D data distribution. In some embodiments, the arbitrary data distribution is a Fourier transform of noise, and the initial 3D data distribution and the arbitrary data distribution may be in the form of functions while the piece of 3D distribution data may be in the form of a matrix.

Figure 5:
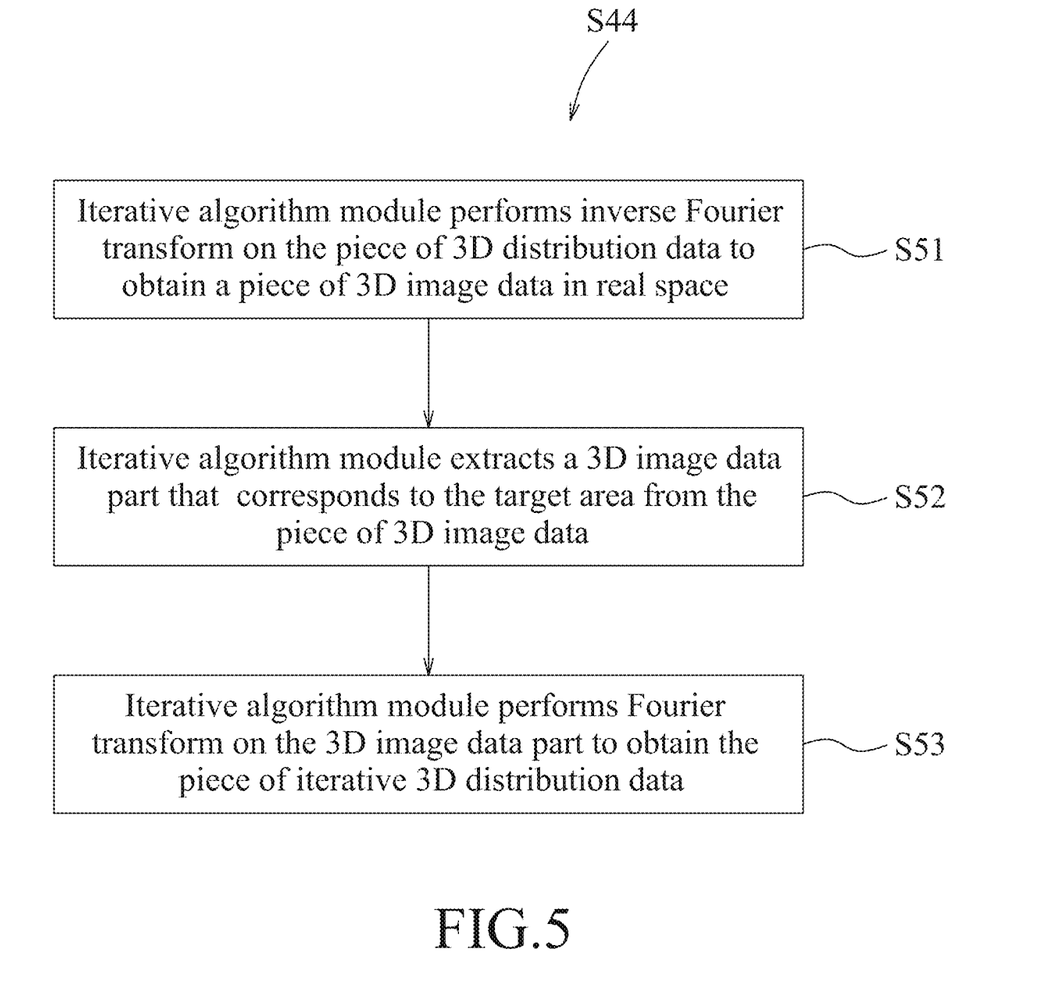
FIG. 5 is a flow chart illustrating sub-steps of an iterative algorithm according to an embodiment of this disclosure.

In sub-step S44, the iterative algorithm module 44 performs an iterative algorithm based on the piece of 3D distribution data to obtain a piece of iterative 3D distribution data in the reciprocal space. Referring to FIG. 5, the iterative algorithm including sub-steps S51 to S53. In sub-step S51, the iterative algorithm module 44 performs inverse Fourier transform on the piece of 3D distribution data to obtain a piece of 3D image data in real space. In sub-step S52, the iterative algorithm module 44 extracts a 3D image data part that corresponds to the target area from the piece of 3D image data. In sub-step S53, the iterative algorithm module 44 performs Fourier transform on the 3D image data part to obtain the piece of iterative 3D distribution data.

In sub-step S45, the iterative algorithm module 44 substitutes a piece of 3D data in the reciprocal space for a data part of the piece of iterative 3D distribution data that corresponds to the target area to obtain a piece of updated 3D distribution data that serves as the piece of 3D distribution data for a next round of the iterative algorithm. In some embodiments, the piece of 3D data is obtained by the processing module 43 in advance by performing Fourier transform on the N number of 2D images, and is stored by the processing module 43 in the storage device 2. Details regarding performing Fourier transform on the N number of 2D images to obtain the piece of 3D data are similar to those as explained in step S42, and are thus omitted herein for the sake of brevity.

In sub-step S46, the iterative determination module 45 determines whether an error between the 3D image data part that was extracted in a latest round of the iterative algorithm and the 3D image data part that was extracted in a second latest round (i.e., the round immediately prior to the latest round) of the iterative algorithm is smaller than a threshold value. A flow of the 3D reconstruction procedure proceeds to sub-step S47 when it is determined that the error is smaller than the threshold value; otherwise, the flow goes back to sub-step S44. In some embodiments, the error between the 3D image data part that was extracted in the latest round of the iterative algorithm and the 3D image data part that was extracted in the second latest round of the iterative algorithm is defined as Error=$\Sigma_{all\ voxel}|O(n)-O(n-1)|/\Sigma_{all\ voxel}O(n)$, where $O(n)$ represents a function of the 3D image data part that was extracted in the latest round of the iterative algorithm, and $O(n-1)$ represents a function of the 3D image data part that was extracted in the second latest round of the iterative algorithm. In some embodiments, the threshold value is 1%.

It is noted that after the iterative algorithm module 44 performs a first round of the iterative algorithm, since the round immediately prior to the first round does not exist, the flow directly goes back to sub-step S44 and then proceeds to sub-steps S45 and S46.

In other words, the iterative algorithm module 44 repeatedly performs the iterative algorithm in sub-step S44 and the substituting of the piece of 3D data in sub-step S45 until it is determined by the iterative determination module 45 that the error between the 3D image data part that was extracted in the latest round of the iterative algorithm and the 3D image data part that was extracted in the second latest round of the iterative algorithm is smaller than the threshold value.

In sub-step S47, the iterative determination module 45 makes the 3D image data part that was extracted in the latest round of the iterative algorithm serve as a piece of reconstructed 3D image data that is obtained in this round of the 3D reconstruction procedure.

Referring once again to FIG. 3, in step S34, the processing module 43 of the processor 4 extracts, from the piece of reconstructed 3D image data obtained in step S33, N pieces of 2D image data that respectively correspond to the N number of different angles to serve as the N number of reference images for a next round of the 3D reconstruction procedure.

In step S35, the reconstruction determination module 46 of the processor 4 determines whether the pixel shifting amounts and the angle rotating amounts recorded for the N number of 2D images in a latest round of the 3D reconstruction procedure match the pixel shifting amounts and the angle rotating amounts recorded for the N number of 2D images in a second latest round of the 3D reconstruction procedure. A flow of the 3D reconstruction method proceeds to step S36 when in the affirmative; otherwise, the flow goes back to step S33.

It is noted that after the processor 4 performs a first round of the 3D reconstruction procedure, since the round immediately prior to the first round does not exist, the flow directly goes back to step S33 and then proceeds to steps S34 and S35.

In other words, the processor 4 repeats the 3D reconstruction procedure in step S33 and the extraction of the N pieces of 2D image data in step S34 until it is determined that the pixel shifting amounts and the angle rotating amounts recorded for the N number of 2D images in the latest round of the 3D reconstruction procedure match the pixel shifting amounts and the angle rotating amounts recorded for the N number of 2D images in the second latest round of the 3D reconstruction procedure. In this way, it can be assured that the N number of aligned 2D images obtained by performing the alignment process on the N number of 2D images in the latest round of the 3D reconstruction procedure are optimum results. Referring to FIG. 6, a right part of the figure illustrates the twenty-five aligned 2D images that respectively correspond to the aforementioned twenty-five angles and that are optimum results of the alignment process.

In step S36, the reconstruction module 47 of the processor 4 generates a reconstructed 3D image of the target area based on the piece of reconstructed 3D image data that was obtained in the latest round of the 3D reconstruction procedure. It is noted that since the piece of reconstructed 3D image data obtained in the latest round of the 3D reconstruction procedure results from the optimum results of the alignment process, image resolution of the reconstructed 3D image may be promoted.

In step S37, the processor 4 controls the display device 3 to display the reconstructed 3D image thus generated for viewing by technicians who inspect and analyze the thin film sample 200.

Figure 7:
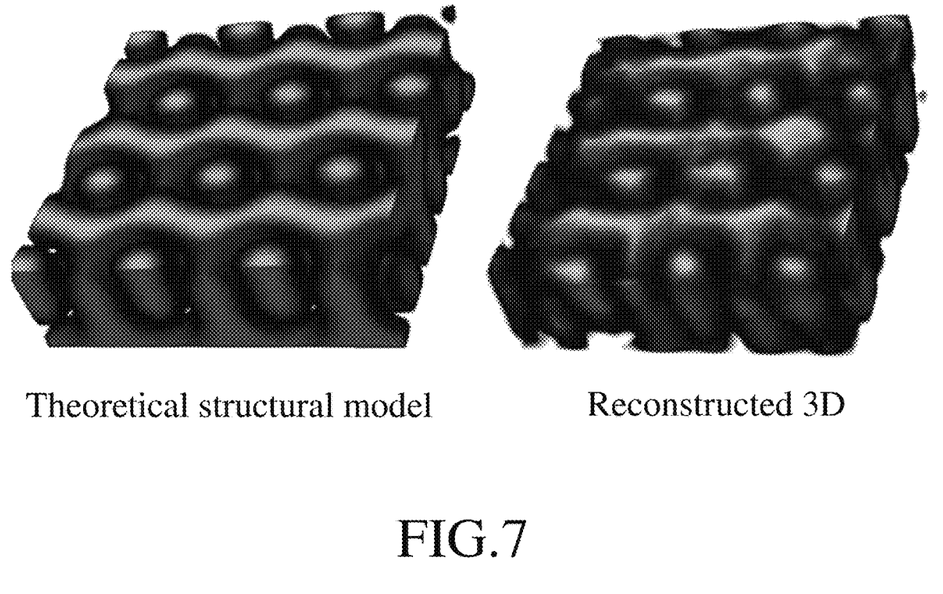
FIG. 7 illustrates examples of a theoretical structural model of a thin film sample and a reconstructed 3D image of the thin film sample.

FIG. 7 exemplarily illustrates a theoretical structural model of the thin film sample 200 (on the left side) and the reconstructed 3D image of the thin film sample 200 generated by the 3D reconstruction method according to an embodiment of this disclosure (on the right side).

To sum up, the original projection images of the target area of the thin film sample captured by the STEM are preprocessed to obtain the 2D images, and the 2D images undergo several rounds of the 3D reconstruction procedure. Particularly, the preprocessing is able to mitigate issues of image deviation, image defects and other factors that may be unfavorable to 3D image reconstruction. Furthermore, in each round of the 3D reconstruction procedure, the alignment process is performed on the 2D images to result in the aligned 2D images and the aligned 2D images then undergo several rounds of the iterative algorithm so as to obtain the piece of reconstructed 3D image data for this round of the 3D reconstruction procedure. Therefore, the reconstructed 3D image generated based on the piece of reconstructed 3D image data that was obtained in the latest round of the 3D reconstruction procedure can have a relatively higher image resolution, in comparison to a reconstructed 3D image that is generated directly based on the original projection images captured by the STEM. In addition, the thin film sample no longer needs staining before image capturing, and a potential structural change in the thin film sample caused by stains can be prevented.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A three-dimensional (3D) reconstruction method for a thin film sample that includes a light element, the 3D reconstruction method to be implemented by a scanning transmission electron microscope (STEM) and a processor, and comprising:

by the STEM, capturing N number of original projection images of a target area of the thin film sample when the target area is at N number of different angles with respect to a horizontal plane, respectively, where N is a positive integer and the N number of different angles include a zero-degree angle, a plurality of positive angles and a plurality of negative angles;

by the processor, performing preprocessing on the N number of original projection images to obtain N number of two-dimensional (2D) images that respectively correspond to the N number of different angles, the preprocessing including noise removal, field-of-view correction and background subtraction;

by the processor, performing a 3D reconstruction procedure based on the N number of 2D images and N number of reference images that respectively correspond to the N number of different angles to obtain a piece of reconstructed 3D image data related to the target area, the 3D reconstruction procedure including for each of the N number of 2D images, performing an alignment process on the 2D image so as to obtain an aligned 2D image that corresponds to the respective one of the N number of different angles, where the alignment process includes image shifting and image rotation, the 2D image is shifted by a pixel shifting amount that falls within a specific pixel range and is rotated by an angle rotating amount that falls within a specific angular range to result in the aligned 2D image such that the aligned 2D image has minimum error in terms of pixel values with respect to the corresponding one of the N number of reference images, and the pixel shifting amount and the angle rotating amount for each of the N number of 2D images are recorded, generating an initial 3D data distribution in reciprocal space based on the aligned 2D images that respectively correspond to the N number of different angles by using discrete Fourier transform and interpolation, combining the initial 3D data distribution and an arbitrary data distribution to obtain a piece of 3D distribution data related to the target area in the reciprocal space, the arbitrary data distribution being related to reciprocal lattice points in the reciprocal space without the initial 3D data distribution, performing an iterative algorithm based on the piece of 3D distribution data to obtain a piece of iterative 3D distribution data in the reciprocal space, the iterative algorithm including performing inverse Fourier transform on the piece of 3D distribution data to obtain a piece of 3D image data in real space, extracting a 3D image data part that corresponds to the target area from the piece of 3D image data, and performing Fourier transform on the 3D image data part to obtain the piece of iterative 3D distribution data, substituting a piece of 3D data in the reciprocal space for a data part of the piece of iterative 3D distribution data that corresponds to the target area to obtain a piece of updated 3D distribution data that serves as the piece of 3D distribution data for a next round of the iterative algorithm, the piece of 3D data being obtained by performing Fourier transform on the N number of 2D images, repeating performing the iterative algorithm and substituting the piece of 3D data until it is determined that an error between the 3D image data part that was extracted in a latest round of the iterative algorithm and the 3D image data part that was extracted in a second latest round of the iterative algorithm is smaller than a threshold value, and making the 3D image data part that was extracted in the latest round of the iterative algorithm serve as a piece of reconstructed 3D image data that is obtained in this round of the 3D reconstruction procedure;

by the processor, extracting, from the piece of reconstructed 3D image data, N pieces of 2D image data that respectively correspond to the N number of different angles to serve as the N number of reference images for a next round of the 3D reconstruction procedure;

by the processor, repeating performing the 3D reconstruction procedure and extracting the N pieces of 2D image data until it is determined that the pixel shifting amount and the angle rotating amounts recorded for the N number of 2D images in a latest round of the 3D reconstruction procedure match the pixel shifting amounts and the angle rotating amounts recorded for the N number of 2D images in a second latest round of the 3D reconstruction procedure;

by the processor, generating a reconstructed 3D image of the target area based on the piece of reconstructed 3D image data that was obtained in the latest round of the 3D reconstruction procedure; and by the processor, controlling a display device to display the reconstructed 3D image thus generated.

2. The 3D reconstruction method as claimed in claim 1, wherein, for the alignment process in a first round of the 3D reconstruction procedure, the 2D image that corresponds to the zero-degree angle serves as the reference image that corresponds to the zero-degree angle, and is identical to the aligned 2D image that corresponds to the zero-degree angle, the alignment process is performed on the N number of 2D images other than the 2D image that corresponds to the zero-degree angle in an order from the 2D image that corresponds to an angle with a smallest magnitude to the 2D image that corresponds to an angle with a largest magnitude, and for each of the N number of different angles other than the zero-degree angle, the reference image that corresponds to this angle is the aligned 2D image that corresponds to an adjacent angle which is next to this angle and has a smaller magnitude than this angle.

3. The 3D reconstruction method as claimed in claim 1, wherein:

the error between the 3D image data part that was extracted in the latest round of the iterative algorithm and the 3D image data part that was extracted in the second latest round of the iterative algorithm is defined as Error=$\Sigma_{all\ voxel}|O(n)-O(n-1)|/\Sigma_{all\ voxel}O(n)$, where $O(n)$ represents a function of the 3D image data part that was extracted in the latest round of the iterative algorithm, and $O(n-1)$ represents a function of the 3D image data part that was extracted in the second latest round of the iterative algorithm; and the threshold value is 1%.

4. A three-dimensional (3D) reconstruction system for a thin film sample that includes a light element, the 3D reconstruction system comprising:

a scanning transmission electron microscope (STEM) that includes a platform which is rotatable about an axis, the thin film sample being disposed on the platform and having a target area that corresponds in position to the axis, the STEM being configured to capture N number of original projection images of the target area when the target area is at N number of different angles with respect to a horizontal plane, respectively, where N is a positive integer and the N number of different angles include a zero-degree angle, a plurality of positive angles and a plurality of negative angles;

a storage device that is configured for data storage;

a display device that is configured for image display; and a processor that is electrically connected to the STEM, the storage device and the display device;

the processor is configured to receive the N number of original projection images from the STEM, and store the N number of original projection images in the storage device;

the processor including a preprocessing module, an alignment module, a processing module, an iterative algorithm module, an iterative determination module, a reconstruction determination module and a reconstruction module;

the preprocessing module is configured to perform preprocessing on the N number of original projection images to obtain N number of two-dimensional (2D) images that respectively correspond to the N number of different angles, where the preprocessing includes noise removal, field-of-view correction and background subtraction;

the processor is configured to perform a 3D reconstruction procedure based on the N number of 2D images and N number of reference images that respectively correspond to the N number of different angles to obtain a piece of reconstructed 3D image data related to the target area;

during the 3D reconstruction procedure, the alignment module, for each of the N number of 2D images, performing an alignment process on the 2D image so as to obtain an aligned 2D image that corresponds to the respective one of the N number of different angles, where the alignment process includes image shifting and image rotation, the 2D image is shifted by a pixel shifting amount that falls within a specific pixel range and is rotated by an angle rotating amount that falls within a specific angular range to result in the aligned 2D image such that the aligned 2D image has minimum error in terms of pixel values with respect to the corresponding one of the N number of reference images, the alignment module recording, for each of the N number of 2D images, the pixel shifting amount and the angle rotating amount in the storage device, the processing module generating an initial 3D data distribution in reciprocal space based on the aligned 2D images that respectively correspond to the N number of different angles by using discrete Fourier transform and interpolation, the processing module combining the initial 3D data distribution and an arbitrary data distribution to obtain a piece of 3D distribution data related to the target area in the reciprocal space, where the arbitrary data distribution is related to reciprocal lattice points in the reciprocal space without the initial 3D data distribution, the iterative algorithm module performing an iterative algorithm based on the piece of 3D distribution data to obtain a piece of iterative 3D distribution data in the reciprocal space, the iterative algorithm including performing inverse Fourier transform on the piece of 3D distribution data to obtain a piece of 3D image data in real space, extracting a 3D image data part that corresponds to the target area from the piece of 3D image data, and performing Fourier transform on the 3D image data part to obtain the piece of iterative 3D distribution data, the iterative algorithm module substituting a piece of 3D data in the reciprocal space for a data part of the piece of iterative 3D distribution data that corresponds to the target area to obtain a piece of updated 3D distribution data that serves as the piece of 3D distribution data for a next round of the iterative algorithm, the piece of 3D data being obtained by performing Fourier transform on the N number of 2D images and being stored in the storage device, the iterative algorithm module repeatedly performing the iterative algorithm and substituting the piece of 3D data until it is determined by the iterative determination module that an error between the 3D image data part that was extracted in a latest round of the iterative algorithm and the 3D image data part that was extracted in a second latest round of the iterative algorithm is smaller than a threshold value, the iterative determination module making the 3D image data part that was extracted in the latest round of the iterative algorithm serve as a piece of reconstructed 3D image data that is obtained in this round of the 3D reconstruction procedure;

the processor is configured to extract, from the piece of reconstructed 3D image data, N pieces of 2D image data that respectively correspond to the N number of different angles to serve as the N number of reference images for a next round of the 3D reconstruction procedure;

the processor is configured to repeatedly perform the 3D reconstruction procedure and extract the N pieces of 2D image data until it is determined by the iterative determination module that the pixel shifting amounts and the angle rotating amounts recorded for the N number of 2D images in a latest round of the 3D reconstruction procedure match the pixel shifting amounts and the angle rotating amounts recorded for the N number of 2D images in a second latest round of the 3D reconstruction procedure;

the reconstruction module is configured to generate a reconstructed 3D image of the target area based on the piece of reconstructed 3D image data that was obtained in the latest round of the 3D reconstruction procedure; and the processor is configured to control the display device to display the reconstructed 3D image thus generated.

5. The 3D reconstruction system as claimed in claim 4, wherein, for the alignment process in a first round of the 3D reconstruction procedure, the 2D image that corresponds to the zero-degree angle serves as the reference image that corresponds to the zero-degree angle, and is identical to the aligned 2D image that corresponds to the zero-degree angle, the alignment process is performed on the N number of 2D images other than the 2D image that corresponds to the zero-degree angle in an order from the 2D image that corresponds to an angle with a smallest magnitude to the 2D image that corresponds to an angle with a largest magnitude, and for each of the N number of different angles other than the zero-degree angle, the reference image that corresponds to this angle is the aligned 2D image that corresponds to an adjacent angle which is next to this angle and has a smaller magnitude than this angle.

6. The 3D reconstruction system as claimed in claim 4, wherein:

the error between the 3D image data part that was extracted in the latest round of the iterative algorithm and the 3D image data part that was extracted in the second latest round of the iterative algorithm is defined as Error=$\Sigma_{all\ voxel}|O(n)-O(n-1)|/\Sigma_{all\ voxel}O(n)$, where $O(n)$ represents a function of the 3D image data part that was extracted in the latest round of the iterative algorithm, and $O(n-1)$ represents a function of the 3D image data part that was extracted in the second latest round of the iterative algorithm; and the threshold value is 1%.

* * * * *